US008743120B2

(12) United States Patent
Aiso

(10) Patent No.: US 8,743,120 B2
(45) Date of Patent: Jun. 3, 2014

(54) CONTROLLER

(75) Inventor: Masaru Aiso, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1149 days.

(21) Appl. No.: 11/715,698

(22) Filed: Mar. 7, 2007

(65) Prior Publication Data

US 2007/0225841 A1 Sep. 27, 2007

(30) Foreign Application Priority Data

Mar. 9, 2006 (JP) ................................ 2006-064208

(51) Int. Cl.
*G06T 11/20* (2006.01)

(52) U.S. Cl.
USPC ..................... 345/440; 345/440.1; 345/440.2; 345/467; 345/469; 700/94; 381/119

(58) Field of Classification Search
USPC ...................... 700/94; 381/119; 345/440–469
See application file for complete search history.

(56) References Cited

U.S. PATENT DOCUMENTS

| | | | | | |
|---|---|---|---|---|---|
| 5,036,542 | A | * | 7/1991 | Kehoe et al. | 381/73.1 |
| 5,343,451 | A | * | 8/1994 | Iizuka | 369/30.19 |
| 5,483,528 | A | * | 1/1996 | Christensen | 370/263 |
| 5,561,467 | A | * | 10/1996 | Takeuchi et al. | 375/240.25 |
| 5,848,146 | A | * | 12/1998 | Slattery | 379/406.01 |
| 5,862,463 | A | * | 1/1999 | Peterson | 455/142 |
| 6,044,431 | A | * | 3/2000 | Greenwood et al. | 711/5 |
| 6,069,878 | A | * | 5/2000 | Christensen | 370/263 |
| 6,160,213 | A | * | 12/2000 | Arnold et al. | 84/615 |
| 6,365,815 | B2 | * | 4/2002 | Ishida | 84/478 |
| 6,636,607 | B1 | * | 10/2003 | Yang et al. | 381/2 |
| 6,747,678 | B1 | * | 6/2004 | Katayama et al. | 715/773 |
| 6,879,864 | B1 | * | 4/2005 | Cleary, Jr. | 700/94 |
| 7,007,240 | B1 | * | 2/2006 | Anderson et al. | 715/790 |
| 7,027,600 | B1 | * | 4/2006 | Kaji et al. | 381/17 |
| 7,224,811 | B1 | * | 5/2007 | Narusawa et al. | 381/119 |
| 7,369,906 | B2 | * | 5/2008 | Frindle | 700/94 |
| 7,561,934 | B2 | * | 7/2009 | Terada et al. | 700/94 |
| 2002/0156547 | A1 | * | 10/2002 | Suyama et al. | 700/94 |
| 2002/0188364 | A1 | * | 12/2002 | Ota et al. | 700/94 |
| 2003/0023332 | A1 | * | 1/2003 | Sugiyama et al. | 700/94 |
| 2003/0059066 | A1 | * | 3/2003 | Kohyama et al. | 381/119 |
| 2003/0196540 | A1 | * | 10/2003 | Ishii | 84/617 |
| 2004/0131209 | A1 | * | 7/2004 | Okabayashi | 381/119 |
| 2004/0148036 | A1 | * | 7/2004 | Sunami | 700/2 |

(Continued)

OTHER PUBLICATIONS

Yamaha. (2004). Studio Manager Owner's Manual, Version 2, Yamaha Corporation, pp. 1-10.

(Continued)

*Primary Examiner* — Abderrahim Merouan
(74) *Attorney, Agent, or Firm* — Morrison & Foerster LLP

(57) ABSTRACT

A controller remote-controlling a digital mixer which performs signal processing to an input signal by a DSP to output the processed signal is provided with functions of: accepting the setting of level of a dummy signal; calculating a gain of the signal processing at each stage in the DSP based on a value of a parameter used for the remote controlling; calculating level that the dummy signal would have at a reference point selected by a reference point selection button if the dummy signal is assumed to be inputted to the DSP, based on the level of the dummy signal and the calculated gain; and displaying the calculated level in a level display portion.

5 Claims, 10 Drawing Sheets

(56) References Cited

U.S. PATENT DOCUMENTS

| | | | | |
|---|---|---|---|---|
| 2005/0036634 | A1* | 2/2005 | Aiso et al. | 381/106 |
| 2006/0147050 | A1* | 7/2006 | Geisler | 381/61 |
| 2006/0174754 | A1* | 8/2006 | Yamada | 84/723 |
| 2006/0218321 | A1* | 9/2006 | Hotta et al. | 710/62 |
| 2006/0286956 | A1* | 12/2006 | Munker et al. | 455/313 |
| 2007/0035650 | A1* | 2/2007 | Suzuki | 348/312 |

OTHER PUBLICATIONS

Yamaha. (2005). M7CL Editor Owner's Manual, Yamaha Corporation, pp. 1-72.

* cited by examiner

FIG. 12

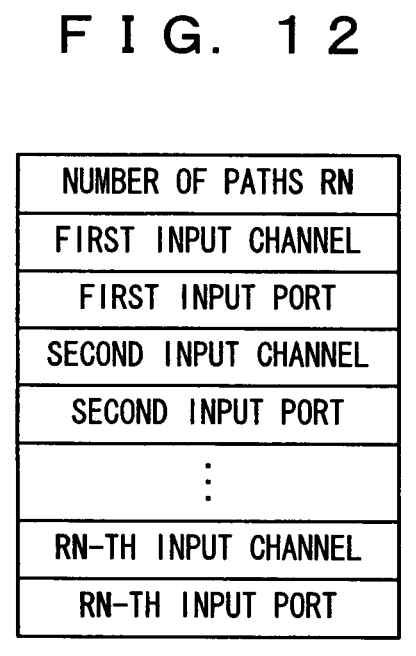

| |
|---|
| NUMBER OF PATHS RN |
| FIRST INPUT CHANNEL |
| FIRST INPUT PORT |
| SECOND INPUT CHANNEL |
| SECOND INPUT PORT |
| ⋮ |
| RN-TH INPUT CHANNEL |
| RN-TH INPUT PORT |

CONTROLLER

BACKGROUND OF THE INVENTION

1. Field of the Invention

The invention relates to a controller remote-controlling a signal processing device which performs signal processing to an input signal by a plurality of processing elements and outputs the processed signal.

2. Description of the Related Art

There has been conventionally known a digital mixer (hereinafter, simply referred to as a "mixer") as a signal processing device which performs signal processing to audio signals inputted via a plurality of input channels, in a plurality of processing elements based on values of various parameters, and outputs the processed signals from a plurality of output channels. It has been practiced that a user is enabled to remote-control the operation of such a digital mixer with a PC (personal computer) by connecting the PC to the mixer and causing the PC to execute a desired program.

There has been known an art to provide a mixer and a PC with the following functions and cause them to perform the following operations.

First, it has been known that a current memory which stores values of parameters to be reflected in currently performed signal processing and a scene memory which stores, as a scene, a set of values of parameters used for controlling the signal processing are prepared in the mixer, and the mixer is provided with functions of storing the contents of the current memory as a scene in the scene memory, or recalling the contents of a scene in the scene memory to the current memory to reflect the called contents in the signal processing.

In this case, a current memory and a scene memory are similarly prepared in a work area prepared on a memory of the PC by a control program, thereby enabling a user to edit, on the PC, the values of the parameters used for controlling the mixer without connecting the PC to the mixer.

Further, when the PC and the mixer are connected and the transition to an online state is instructed, synchronous processing is performed to make the contents of the current memory and the scene memory on the PC side and those on the mixer side match each other. Further, in this online state, operation events are mutually transmitted to/from the PC side and the mixer side, and when some operation for changing the contents of the current memory or the scene memory takes place in either side, the same changes are made to the contents in the PC side and the mixer side, thereby maintaining the synchronization.

Further, it has been also known that when a request data is transmitted from the PC side to the mixer side, status data indicating a state of the mixer such as levels of currently processed signals and so on is transmitted from the mixer side to the PC side in response to the request, so that it is realized to display, in the PC side, the state of the mixer such as the signal levels at a desired point of a desired input channel and so on by utilizing the state data.

The above mixer and control program are described in, for example, "Studio Manager version 2 Owner's Manual" and "PM5D Editor Owner's Manual" by Yamaha Corporation.

SUMMARY OF THE INVENTION

When the mixer and the PC described above are used, the PC is sometimes used independently to edit parameters used for controlling the mixer, because the PC provides better operability for parameter editing and higher portability. Further, especially as for volume (signal level), since setting the volume does not require much consideration of tone and quality of sound, there has been a demand for enabling a user to make the setting so as to obtain a desired volume before the mixer is connected to the PC to actually perform signal processing.

However, in a case where the parameters are edited only with the independent use of the PC, a user cannot confirm how an output signal corresponding to an input signal is outputted when the mixer is caused to perform signal processing according to the edited parameters, until the PC is connected to the mixer to be in the online state. Therefore, editing with the independent use of the PC has a problem that it is difficult to edit the parameters so as to obtain a desired output.

It is an object of the invention to solve such a problem and make it possible, when the signal processing device is intended to be remote-controlled by the controller, to easily confirm the signal levels which would be obtained if signal processing is performed according to the remote controlling, without using the signal processing device.

To attain the above objects, the controller of the invention is a controller remote-controlling a signal processing device which performs signal processing to an input signal by a plurality of processing elements to output the processed signal, the controller including: a setting device that sets input of a dummy signal to a predetermined processing element among the processing elements; a reference point designating device that designates, as a reference point, a point which is set in a path of the signal processing and regarding which level display is to be performed; a path detector that detects a signal processing path from the predetermined processing element to the reference point; a level calculator that calculates a level of the dummy signal which reaches the reference point via the detected path, based on a value of a parameter used for the remote controlling; and a display controller that causes a display to perform a level display regarding the reference point, based on the calculated level.

In such a controller, preferably, the path detector is capable of detecting a plurality of the signal processing paths for the reference point, the level calculator has a device that calculates a level of the dummy signal regarding each of the plural signal processing paths when the plural signal processing paths are detected, and the display controller has a device that integrates the plural calculated levels and causes the display to perform the level display based on the integrated level.

Preferably, the display controller causes the display to perform the level display indicating that no signal is inputted, regarding the reference point for which no signal processing path is detected by the path detector.

Preferably, said display controller has a device that obtains from the signal processing device a level of a signal under processing in the signal processing device at said reference point and causes the display to perform the level display regarding the reference point, based on the obtained level, when the controller and the signal processing device are in an online state.

Preferably, the path detector and the level calculator operate when the signal processing device is in an offline state.

Further, the invention can be implemented not only as a device invention but also as a method invention. Further, the invention can be implemented as a program of a processor such as a computer, and also can be implemented as a memory storing such a program.

The above and other objects, features and advantages of the invention will be apparent from the following detailed description which is to be read in conjunction with the accompanying drawings.

BRIEF DESCRIPTION OF THE DRAWINGS

FIG. 10 is a flowchart of calculation processes of a gain value of a volume used at Step S45 in FIG. 9 and so on;

FIG. 12 is a view showing an example of path data registered as a search result by the processes shown in FIG. 11.

DETAILED DESCRIPTION OF THE PREFERRED EMBODIMENTS

Hereinafter, the best mode for carrying out the invention will be concretely described based on the drawings.

Figure 1:
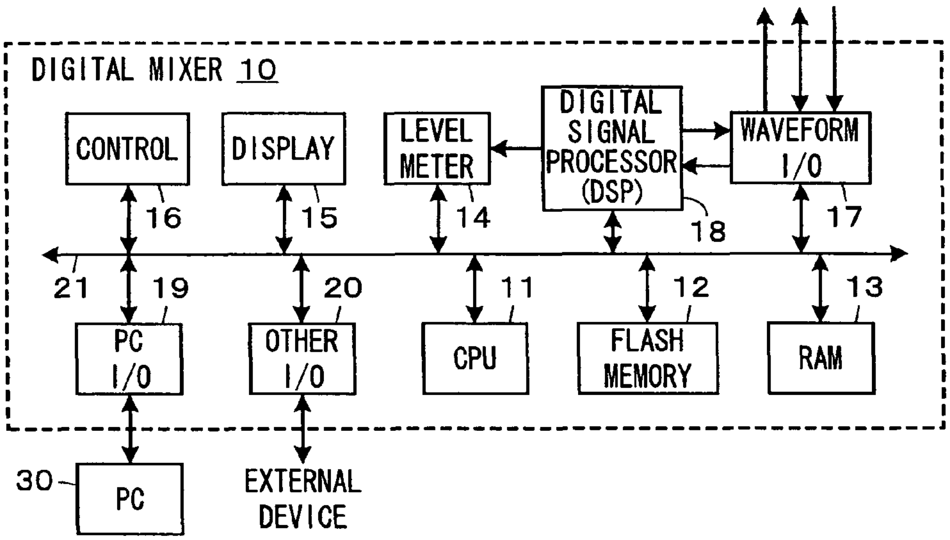
FIG. 1 is a block diagram showing the configuration of a mixer system including a PC which is an embodiment of the controller of the invention and a digital mixer which is an example of a signal processing device controlled by the PC.

First, FIG. 1 shows the configuration of a mixer system including a PC which is an embodiment of the controller of the invention and a digital mixer which is an example of a signal processing device controlled by the PC.

As shown in FIG. 1, this mixer system is composed of the digital mixer 10 and the PC 30 connected to each other.

The PC 30 is a well-known PC having a CPU, a ROM, a RAM, and so on as hardware, and has a display as a display means. For example, a PC operating under an operating system (OS) such as Windows XP® is usable as the PC 30. By executing a control program which is an embodiment of the program of the invention, as an application program on the OS, the PC 30 can function as the controller remote-controlling the digital mixer 10.

Functions as the controller include: a function of editing values of parameters which are used when causing the digital mixer 10 to execute signal processing; a function of transmitting the edited values of the parameters to the digital mixer 10 to cause the digital mixer 10 to execute the signal processing based on the values; a function of changing the values of the parameters in the digital mixer 10 based on an operation accepted by the PC 30 side when the PC 30 and the digital mixer 10 are in an online state in which the PC 30 side and the digital mixer 10 side perform synchronous processing; a function of sending to the digital mixer 10 a command for the transmission of desired data and displaying a screen showing states of the signal processing in the digital mixer 10 such as levels and frequency characteristics of signals currently processed by the digital mixer 10, according to the received data which is outputted from the digital mixer 10 in response to the command; and so on.

The PC 30 realizes operations and functions to be described below by executing the aforementioned control program, unless otherwise noted.

The digital mixer 10 includes a CPU 11, a flash memory 12, a RAM 13, a level meter 14, a display 15, a control 16, a waveform I/O 17, a digital signal processor (DSP) 18, a PC input/output part (I/O) 19, and other I/O 20, all of which are connected to one another via a system bus 21. The digital mixer 10 has a function of performing various signal processing to audio signals inputted via a plurality of input channels and outputting the processed signals from a plurality of output channels. Incidentally, this digital mixer 10 can be independently operated without the PC 30 being connected thereto.

The CPU 11 is a controller controlling the whole operation of the digital mixer 10. By executing a desired control program stored in the flash memory 12, the CPU 11 executes processing such as: control of the data transmission/reception in the waveform I/O 17 and the PC I/O 19, the display on the level meter 14 and the display 15, and signal processing in the DSP 18; and detection of operations of the control 16 to control the setting/change of parameter values and the operation of respective parts according to the detected operation.

The flash memory 12 is a rewritable nonvolatile memory storing the control program executed by the CPU 11 and so on.

The RAM 13 is a memory which stores data to be temporarily stored and is used as a work memory of the CPU 11.

The level meter 14 is a level display displaying, for each channel, levels of signals under processing at later-described reference points provided in input channels and output channels of the DSP 18, and can be realized by, for example, a display wherein the number of LEDs to be lighted is changed according to the level. Further, the level meter 14 displays the levels according to the control by the CPU 11 but can be supplied with data indicating the levels directly from the DSP 18.

The display 15 is other display displaying various data according to the control by the CPU 11, and can be constituted by, for example, a liquid crystal panel (LCD) or a light-emitting diode (LED). Preferably, the LCD has a size large enough to display a graphical user interface (GUI) for accepting reference and setting of values of parameters. Further, the function of the aforementioned level meter 14 may be realized by a desired screen displayed on this LCD.

The control 16 is to accept an operation to the digital mixer 10 and can be constituted of various keys, buttons, dials, sliders, and the like. Here, a touch panel stacked on an LCD of the display 15 is also used.

The waveform I/O 17 is an interface to accept the input of audio signals to be processed in the DSP 18 and output the processed audio signals. The waveform I/O 17 has a plurality of analog input ports each converting an analog signal to a digital signal to input the digital signal; a plurality of analog output ports each converting a digital signal to an analog signal to output the analog signal, a plurality of digital input ports each converting a format of a digital signal to a signal format used in the digital mixer 10 to input the resultant signal; and a plurality of digital output ports each converting a format of a digital signal to a signal format used in an external device to output the resultant signal.

The DSP 18 is a digital signal processor which includes a signal processing circuit, and executes micro-programs set by the CPU 11 to perform various kinds of signal processing such as mixing and equalizing and the like to the audio signals inputted from the waveform I/O 17, according to values of various parameters which are set as current data, and outputs the processed audio signals to the waveform I/O 17. The current data used for the processing can be stored in the RAM 13 or in a memory that the DSP 18 itself has.

Incidentally, as elements of the signal processing performed by the DSP 18, 24 input channels are provided, and the input ports of the waveform I/O 17 are made to correspond to the input channels of the DSP 18 respectively by an input patch, whereby a signal inputted to the waveform I/O 17 can be inputted to the corresponding input channel.

Further, as elements of the signal processing performed by the DSP 18, 12 mixing (MIX) buses are provided, and signals inputted to the input channels can be sent to the respective buses according to the set contents of the parameters, and signals inputted to the same bus can be mixed.

Outputs of these buses are outputted from corresponding output channels, and as for output paths, similarly to the input paths, the output channels of the signal processing performed by the DSP 18 are made to respectively correspond to the output ports of the waveform I/O 17 by an output patch.

The PC I/O 19 is an interface for communication with the PC 30, and can be, for example, an interface of a USB (Universal Serial Bus) type or can be an interface for communication by Ethernet®.

The other I/O 20 is an interface connected to various external devices and inputting/outputting data from/to the external devices. For example, interfaces for connection to an external display, a mouse, a keyboard for character input, an operation panel, and the like are prepared as the other I/O 20. Even if the display 15 and the control 16 of a main body of the device have a very simple structure, it is conceivable to make it possible to change/set parameters and give operation instructions by making full use of these external devices.

Next, components involved in the signal processing realized by the waveform I/O 17 and the DSP 18 shown in FIG. 1 will be described in more detail.

Figure 2:
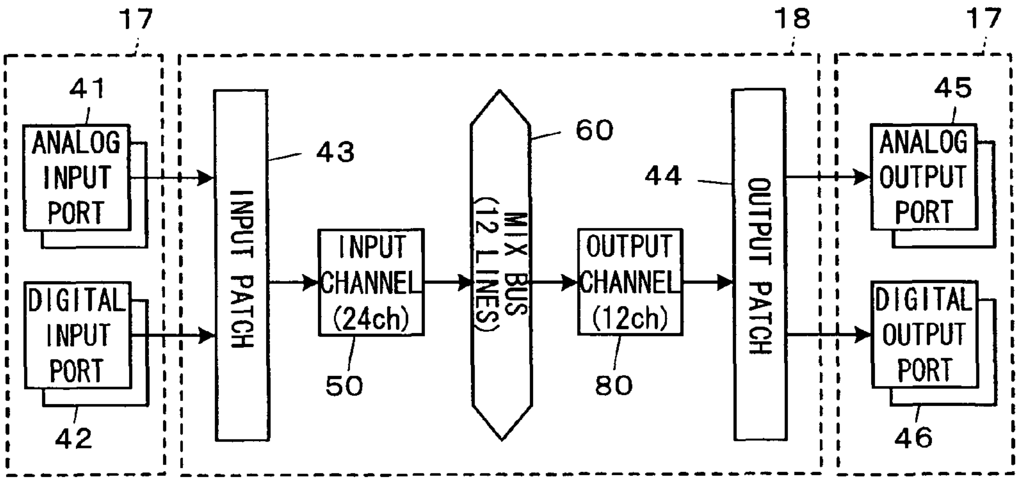
FIG. 2 is a diagram showing in more detail components involved in signal processing realized by a waveform I/O and a DSP shown in FIG. 1.

As shown in FIG. 2, as processing elements for the signal processing performed by the DSP 18, an input patch 43, input channels 50, MIX buses 60, output channels 80, and an output patch 44 are provided.

In the DSP 18, the input patch 43 selectively patches (connects) one of a plurality of analog input ports 41 or one of a plurality of digital input ports 42 of the waveform I/O 17 to each of inputs of the 24 input channels 50, an audio signal inputted from the patched input port is supplied to the corresponding input channel 50 to undergo signal processing by an attenuator, an equalizer, and so on in this input channel 50, and the processed signal is transmitted to each of the 12-line MIX buses 60. This transmission can also be made OFF.

In the MIX buses 60, the signals inputted from the input channels 50 are mixed, and a signal resulting from the mixing is outputted to the 12 output channels 80 provided for the respective channels of the MIX buses 60. Then, in each of the output channels 80, signal processing is performed to the signal inputted from the MIX bus 60 by an equalizer, a compressor, and so on, and the processed signal is outputted to the output patch 44. The output patch 44 selectively patches (connects) one of the 12 output channels 80 to each of the plural analog output ports 45 and the plural digital output ports 46, and the audio signal outputted from the patched output channel 80 is outputted from the output port to which the output channel 80 is patched.

Incidentally, by setting predetermined parameter values, it is possible to control the contents of the signal processing by these parts provided in the DSP 18, and functions of the respective parts may be realized by software or by hardware.

Figure 3:
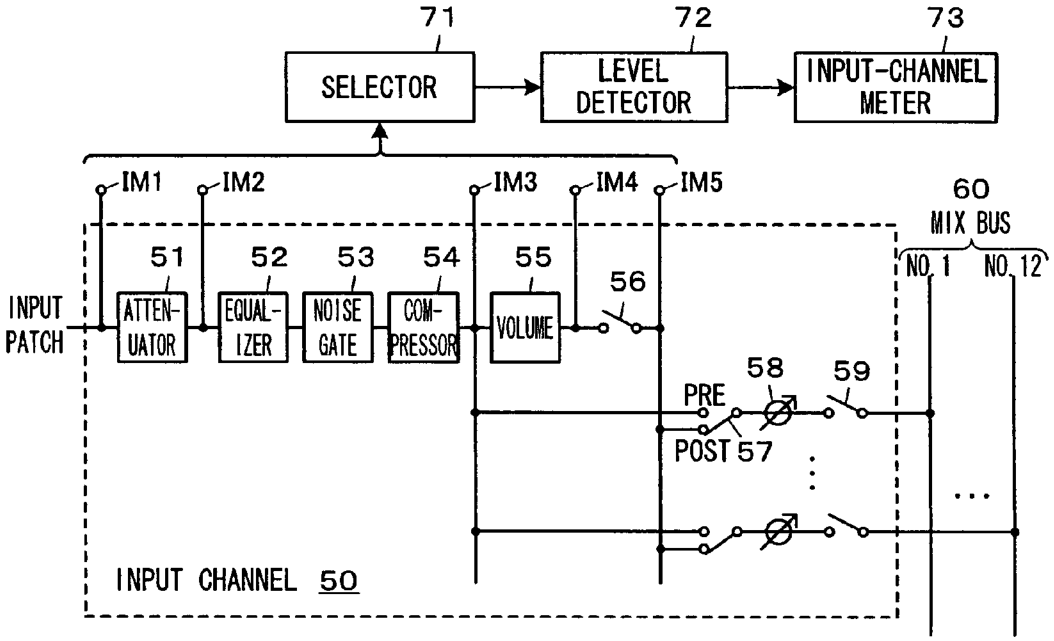
FIG. 3 is a diagram showing in more detail the structure of an input channel shown in FIG. 2.

Next, FIG. 3 shows in more detail the structure of the input channel 50 shown in FIG. 2.

As shown in FIG. 3, each of the input channels 50 has an attenuator 51, an equalizer 52, a noise gate 53, a compressor 54, a volume 55, and an ON switch 56. In each path ahead through which a signal is inputted to each of the MIX buses 60, a PRE/POST switch 57, a send level fader 58, and a send ON switch 59 are provided. These parts also correspond to processing elements.

Among them, the attenuator 51 has a function of attenuating a signal. The equalizer 52 has a function of adjusting a frequency characteristic of a signal. The noise gate 53 has a function of reducing noise by attenuating a signal at predetermined level or lower. The compressor 54 has a function of narrowing a dynamic range by attenuating a signal at predetermined level or higher. The volume 55 has a function of adjusting level of a signal. The ON switch 56 has a function of switching ON/OFF of output.

Incidentally, in deciding a final gain of the volume 55, a gain decided by a fader corresponding to the input channel 50 is taken into consideration, and besides, in a case where the input channel 50 belongs to a DCA group, a gain decided by a fader corresponding to this DCA group is also taken into consideration.

The PRE/POST switch 57 is a switch to select the acquisition position of a signal which is to be sent to the corresponding MIX bus 60. The send level fader 58 has a function of adjusting level of a signal which is to be sent to the MIX bus 60. The send ON switch 59 has a function of switching ON/OFF of signal output to the MIX bus 60.

A signal inputted to such an input channel 50 sequentially undergoes signal processing in the attenuator 51 up to the compressor 54, and thereafter, if the PRE/POST switch 57 is on the PRE side, the processed signal is inputted directly to the transmission path to each of the MIX buses 60, and if the PRE/POST switch is on the POST side, the signal further undergoes signal processing in the volume 55 and the ON switch 56 and is inputted to the transmission path. Then, the signal undergoes here signal processing by the send level fader 58 and the send ON switch 59 and thereafter is inputted to the corresponding MIX bus 60.

In the input channel 50, reference points IM1 to IM5 are set as reference points where data is sampled when the level of a signal under processing is monitored. A value of the signal under processing at one of the reference points IM1 to IM5 is selected by a selector 71 to be sent to a level detector 72, where the level is detected, and the level can be displayed by an input-channel meter 73 included in the level meter 14.

FIG. 3 shows the structure of only one input channel 50, but the other 23 input channels 50 also have the same structure, and signals inputted from these 24 input channels 50 can be mixed in each of the MIX buses 60. The MIX buses 60 also correspond to processing elements performing mixing processing.

Figure 4:
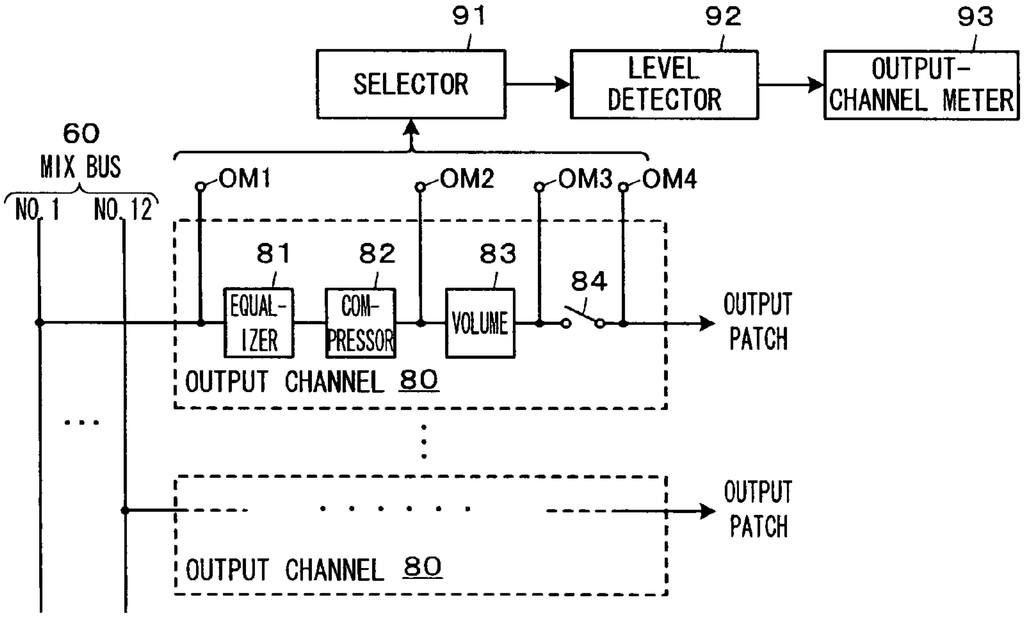
FIG. 4 is a diagram showing in more detail the structure of an output channel shown in FIG. 2.

Next, FIG. 4 shows in more detail the structure of the output channel 80 shown in FIG. 2.

As shown in FIG. 4, each of the output channels 80 has an equalizer 81, a compressor 82, a volume 83, and an ON switch 84. These parts also correspond to processing elements, and have the same functions as the processing elements with the same names provided in the input channel 50 described above.

A signal resulting from the mixing in the corresponding MIX bus 60 is inputted to each of the output channels 80, and after undergoing signal processing in the equalizer 81 up to the ON switch 84 in sequence, this signal is outputted to the output port patched by the output patch 44.

In the output channel 80, reference points OM1 to OM4 are set as reference points where data is sampled when the level of a signal under processing is monitored. A value of the signal under processing at one of the reference points OM1 to OM4 is selected by a selector 91 to be sent to a level detector 92, where the level is detected, and the level can be displayed by an output-channel meter 93 included in the level meter 14.

The selector 91 is capable of selecting the reference point completely independently of the selector 71. FIG. 4 shows in detail the structure of only one output channel 80, but the other 11 output channels 80 also have the same structure.

Incidentally, the PC 30 included in the mixer system shown in FIG. 1 is capable of editing values of parameters independently even when the digital mixer 10 is not connected thereto and even when it is not in an online state. The feature of this embodiment lies in that, even in such cases, it is possible to easily confirm what signal level would be obtained by signal processing if the digital mixer 10 is caused to execute the signal processing by using values resulting from the editing This feature will be described next.

With respect to the above feature, the PC 30 has functions of accepting user's designation of level of a dummy signal assumed to be inputted to each input port of the digital mixer 10 and user's designation of one of the reference points where the level of the signal is to be monitored, and displaying level that the signal at the designated reference point if the digital mixer 10 is caused to perform signal processing to signals at the designated levels based on current data.

To find the signal level at the reference point, a gain value of the signal processing in each of the processing elements is calculated based on current data, and the designated level of the input signal is sequentially changed according to the gain value in each of the processing elements while the path of the signal processing is traced up to the reference point in the DSP 18.

In this case, since only the level of the signal is of interest here, a processing element such as the equalizer 52 whose gain changes depending on the frequency of the signal is disregarded. Further, since the input signal level is a specific designated value, processing elements such as the noise gate 53 and the compressor 54 whose gains dynamically change according to an input signal are also disregarded, and this causes no great problem. To adjust the equalizer 52, the noise gate 53, and the compressor 54, in most cases, an audio signal is actually inputted to the digital mixer 10 and these processing elements are adjusted while the output thereof is listened to by ear, and therefore, from this viewpoint, it is not highly necessary that these processing elements are taken into consideration when the level is displayed in an offline state.

Figure 5:
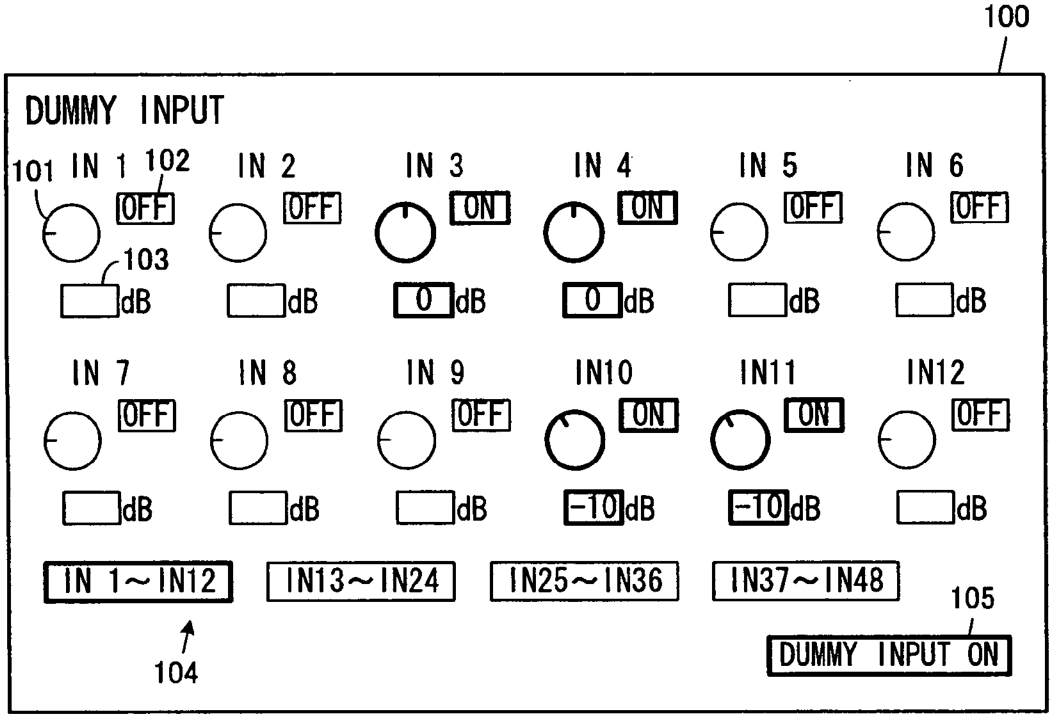
FIG. 5 is a view showing a display example of a dummy input setting screen displayed on the PC shown in FIG. 1.

Here, FIG. 5 shows a display example of a dummy input setting screen for accepting the above-described designation of the input signal level.

In the PC 30, it is possible to display a dummy input setting screen 100 shown in FIG. 5 on the display and accept the designation of the levels of dummy signals which are assumed to be inputted to the respective input ports of the digital mixer 10.

FIG. 5 shows an example of a state where the levels of signals assumed to be inputted to the first to the twelfth input ports are accepted, and by rotating a knob 101 with the use of a pointing device or the like, or by directly inputting values to level input portions 103 with the use of a keyboard or the like, it is possible to designate the signal levels for the respective ports.

Further, ON/OFF switches 102 are provided for the respective ports, so that presence/absence of signal input can be designated for each of the ports. The signal level can be designated for a port whose input is set at OFF, but the designation is effective only for a port whose input is set at ON. Incidentally, dB (decibel) is a unit expressing the level as a relative value. Any value may be decided as its absolute value, and here, 0 dB is defined as signal level of 0.775 v (volt) which is known as 1 dBu.

Further, in the dummy input setting screen 100, port selection buttons 104 are provided, and with these buttons, input ports for which the designation of the signal levels are accepted can be changed in a unit of 12 ports. Further, a switch button 105 is provided, and with this button, ON/OFF of the above-described signal display function itself using dummy signals can be switched.

The CPU of the PC 30 functions as a setting device when executing the above processing for setting the levels of the dummy signals according to the instructions accepted in the dummy input setting screen 100 described above.

Figure 6:
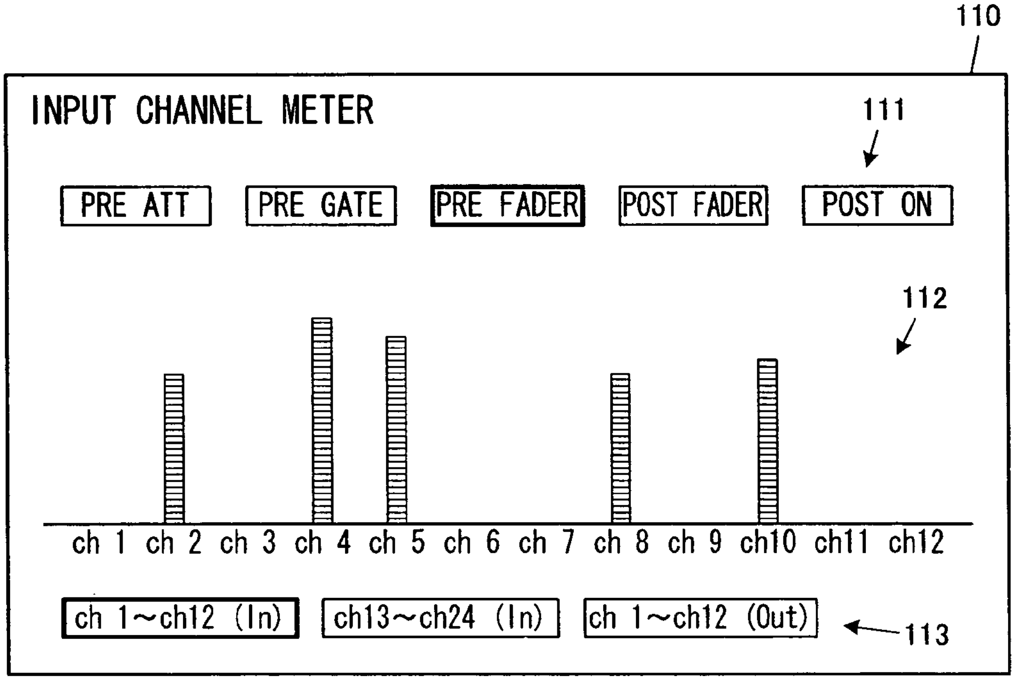
FIG. 6 is a view showing a display example of a level display screen displayed on the same PC.

Next, FIG. 6 shows a display example of a level display screen displaying signal levels at any of the reference points.

In the PC 30, a level display screen 110 shown in FIG. 6 can be displayed on the display, and in a level display portion 112, it is possible to display a bar graph representing signal levels at the designated reference point if the signals at the signal levels accepted in the dummy input setting screen 100 are inputted to the input ports of the digital mixer 10 and the digital mixer 10 is caused to execute signal processing according to current data.

Here, the vertical scale represents decibel and graduations, though not displayed, may of course be displayed. As in typical mixers, resolution of the bar graph is preferably uneven so as to be higher in the vicinity of 0 dB, and the graduations are also preferably displayed according to the resolution.

Further, the reference point can be selected by using reference point selection buttons 111. In the shown example, signal levels in the input channels are displayed, and for this purpose, the reference point selection buttons 111 are provided as five buttons of PRE ATT, PRE GATE, PRE FADER, POST FADER, and POST ON in correspondence to the reference points IM1 to IM5 provided in the input channels 50.

Further, channel selection buttons 113 are provided, with which channels for the signal level display can be selected in a unit of a channel group each consisting of 12 channels. When the output channels are selected by this button, the reference point selection buttons 111 are changed to four buttons of PRE EQ, PRE FADER, POST FADER, POST ON corresponding to the reference points OM1 to OM4 provided in the output channels 80.

The CPU of the PC 30 functions as a reference point designating device when executing processes for designating points for the level display as the reference point, according to the instruction accepted in the level display screen 110 described above.

Incidentally, when the PC 30 and the digital mixer 10 are operated in the online state, as in conventional mixers and control programs, the level display screen 110 can be used to display levels of signals currently processed in the DSP 18, by using data supplied from the CPU 11 of the digital mixer 10 via the PC I/O 19.

Next, processes executed when the PC 30 displays the signal levels in the level display screen 110 will be described by using FIG. 7 to FIG. 13.

Figure 7:
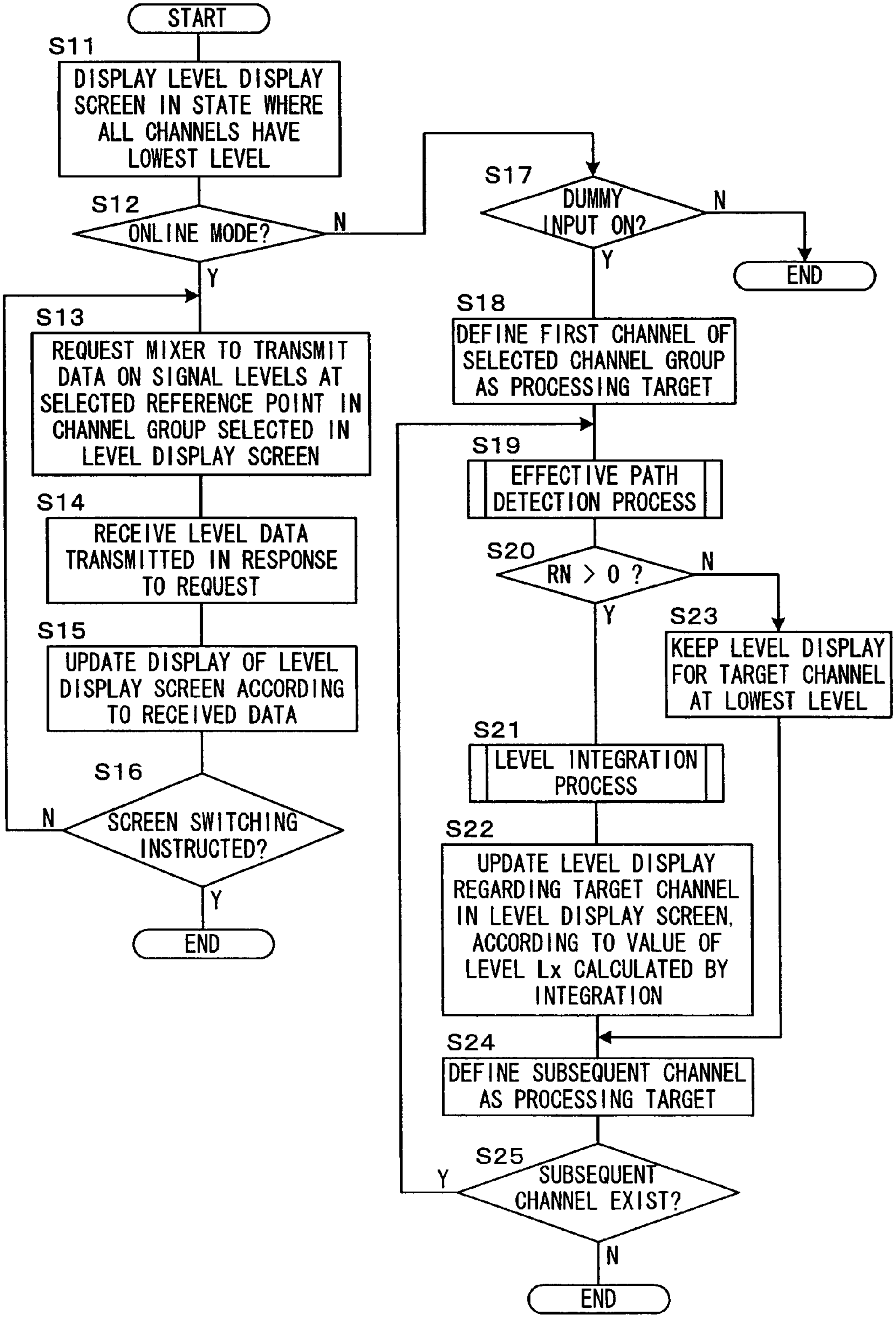
FIG. 7 is a flowchart of processes executed by a CPU of the PC shown in FIG. 1 when displaying the level display screen is instructed.

First, FIG. 7 shows a flowchart of processes executed when displaying the level display screen is instructed.

The CPU of the PC 30 starts the processes shown in the flowchart in FIG. 7 when displaying the level display screen 110 is instructed by a predetermined operation after the setting of the input signal levels are accepted in the dummy input setting screen 100.

Then, first, the level display screen 110 is displayed in a state where all the channels have the lowest level, that is, in a state without any bar in the level display portion 112 (S11). Then, if the digital mixer 10 is in the online state, the CPU of the PC 30 requests the digital mixer 10 to transmit data on signal levels at a selected reference point in a channel group selected in the level display screen 110 (S12, S13).

Then, the CPU 11 of the digital mixer 10 receiving the request via the PC I/O 19 receives the data on the signal levels at the reference point from the DSP 18 and transmits the data to the PC 30 via the PC I/O 19. The CPU receives the transmitted data (S14), and updates the display of the level display screen 110 according to the data (S15). If the data cannot be received within a predetermined time, the transmission of the data is preferably requested again.

Thereafter, if screen switching is not instructed (S16), the flow returns to Step S13 and the processes are repeated, and if screen switching is instructed, the processes are finished, and displaying of another screen, erasing of the level display screen 110, and so on are performed as required by not shown processes. Since the level display may be updated in a relatively long period of several milliseconds to several hundred milliseconds, a standby process may be inserted between Step S16 back to Step S13. Incidentally, in a case where the digital mixer 10 is configured to continue the periodic transmission of data for a predetermined time in response to the request for the transmission of the data, the processes at Step S14 and Step S15 are repeated to update the level display during the predetermined time, and the process at Step S13 may be executed after the predetermined time has passed or when the selection of the channel group or the reference point is changed.

As described above, in the online state, constantly changing levels of audio signals are received from the digital mixer 10 and accordingly, the level display in the PC 30 is updated. Incidentally, even while the level display screen 110 is displayed, it is possible to change parameter values of the processing elements stored in the current memories of the digital mixer 10 and the PC 30, by operating controls of the main body of the digital mixer 10. Further, by configuring the PC 30 to be capable of opening a control screen for accepting the setting of the parameter values of the processing elements on a window different from the level display screen 110, it is possible to change the parameter values in the current memory on the PC 30 side while the signal levels are displayed.

On the other hand, if it is determined at Step S12 that the digital mixer 10 is not in the online state, the flow goes to Step S17. Then, if dummy input ON has not been set by the switch button 105 in the dummy input setting screen 100 (S17), the processes are finished immediately. In this case, the level display portion 112 comes to be in a state of displaying nothing.

On the other hand, if dummy input ON is set, the CPU defines the first channel of the selected channel group as a processing target (target channel) (S18), and executes an effective path detection process (S19). This process, which differs depending on whether the target channel is an input cannel or an output channel, will be described in detail later. Then, if an effective path is detected in this process (S20), that is, if the number of paths RN is larger than 0, the CPU executes a level integration process (S21) and updates the level display for the target channel in the level display screen 110 according to a value of level Lx calculated by the integration (S22), and the flow goes to Step S24. The level integration process, which also differs depending on whether the target channel is an input channel or an output channel, will be described in detail later.

On the other hand, if no effective path is detected at Step S20, it is determined that the signal does not reach the selected reference point, and the CPU keeps the level display for the target channel at the lowest level (S23), and the flow goes to Step S24.

Then, in either case, the CPU defines a subsequent channel as a target channel (S24), and if a subsequent channel exists, the flow returns to Step S19 and the processes are repeated (S25). If there is no subsequent channel, the processes are finished.

In the processes at Step S19 and Step S21 among the above processes, the CPU of the PC 30 functions as a path detector and a level calculator respectively.

Incidentally, as for the dummy input, the level display after once performed need not be updated unless the setting is changed thereafter since the input levels do not change with time. Therefore, the processes are finished here. In a case where various parameters stored in the current memory, such as input level, a channel group, a reference point, and so on, are made changeable by operations on a window different from the level display screen 110, the display is automatically updated by executing the processes at and after S17 again after the parameters in the current memory are changed according to the change operation.

Further, the bars representing the signal levels in the respective channels may be vibrated with the level Lx in the corresponding channel as an upper limit, instead of being fixed. This can present the display of a natural image which appears as if the signals are actually processed by the digital mixer 10.

Figure 8:
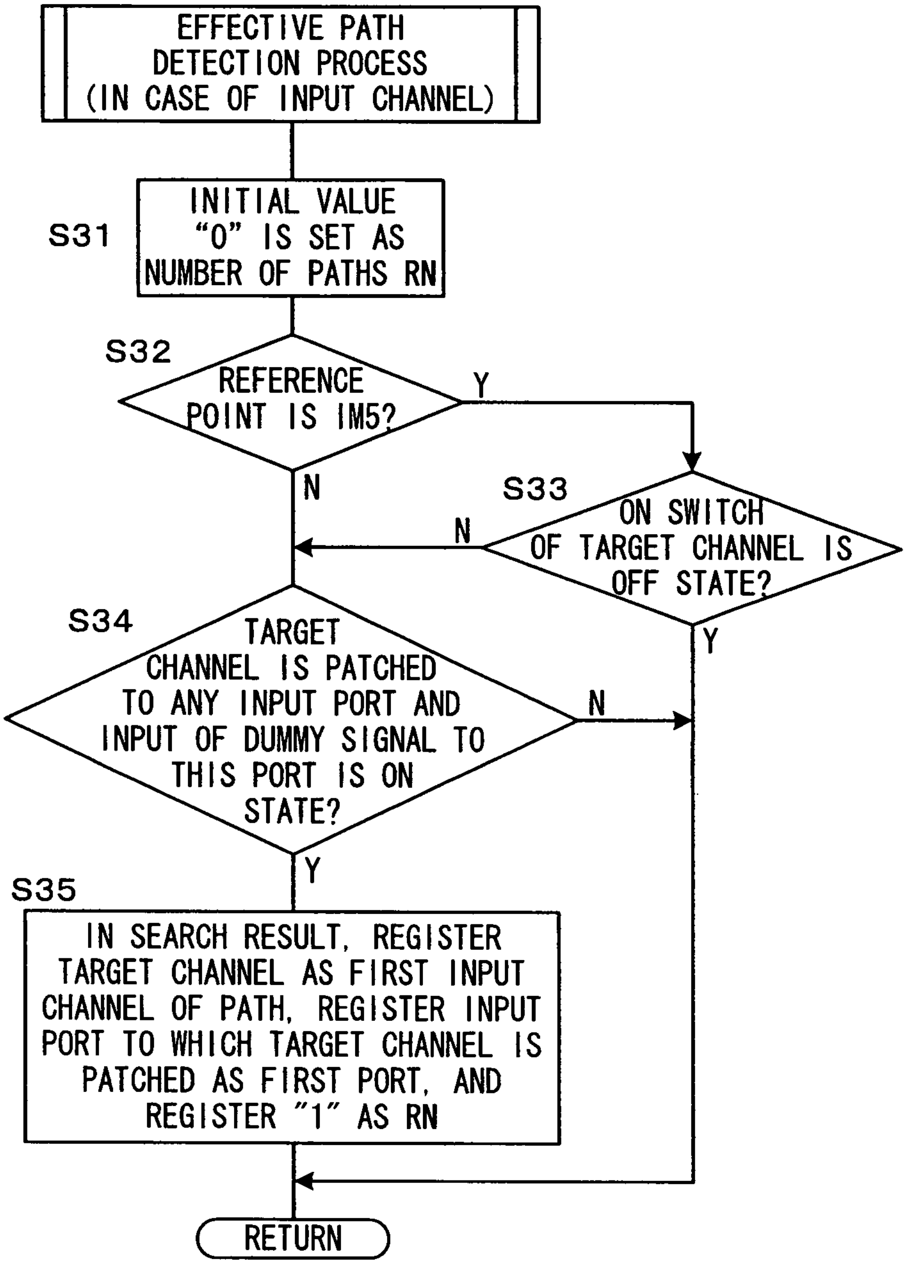
FIG. 8 is a flowchart of an effective path detection process shown in FIG. 7 when a target channel is an input channel.

Next, FIG. 8 shows a flowchart of the effective path detection process when the target channel is an input channel.

The effective path detection process shown at Step S19 in FIG. 7 is a process to find, in the target channel, a path in the middle of which there exists no processing element turning off the signal, out of the signal supply paths passing through the reference point designated in the level display screen 110. If the target channel is the input channel 50, processes shown in FIG. 8 are executed as this process.

In these processes, first, the CPU of the PC 30 sets an initial value 0 as the number of paths RN (S31). Then, if the reference point is IM5 and the ON switch 56 of the target channel is OFF, this means that a processing element turning off the signal exists in the middle of the signal processing path and the signal does not reach the reference point IM5 in the target channel, and therefore, the flow returns directly to the original process (S32, S33). In this case, RN remains 0, which indicates that no effective path has been detected.

Further, if NO at either Step S32 or Step S33, and if the target channel is patched to some input port by the input patch 43 and the dummy signal input to this port is ON (S34), this means that the signal inputted from this input port reaches the reference point IM5, and therefore, the CPU resisters this input port and the target channel as a path search result, and since one path is found, also registers “1” as the RN (S35), and the flow returns to the original process. Here, since the registration of the input port is not always necessary because the input port is known by referring to the state of the input patch 43 when necessary.

On the other hand, if NO at Step S34, this means that the signal does not reach the reference point in the target channel, and therefore, the flow goes directly to the original process, similarly to the case of YES at Step S33.

Figure 9:
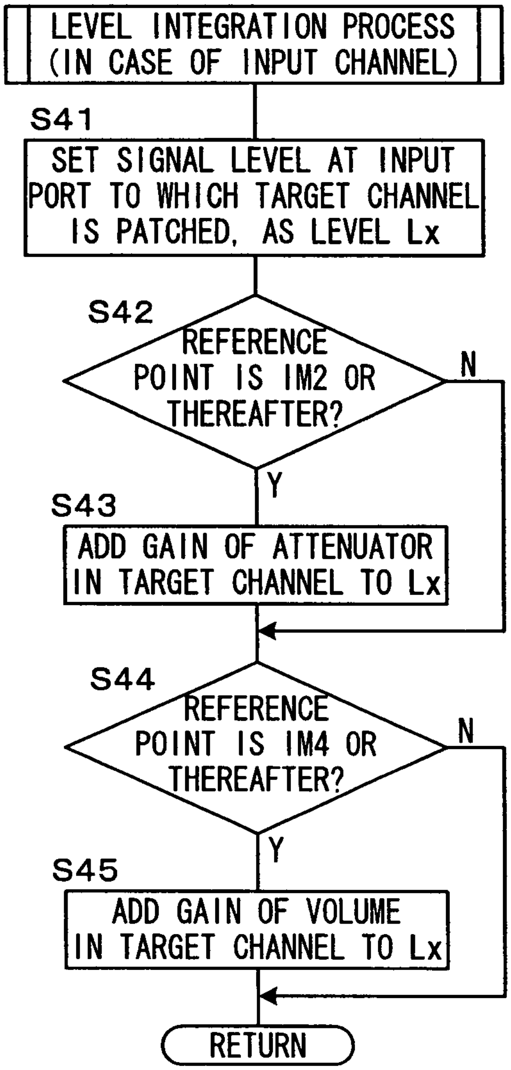
FIG. 9 is a flowchart of a level integration process shown in FIG. 7 in a case where the target channel is an input channel.

Next, FIG. 9 shows a flowchart of the level integration process in a case where the target channel is an input channel.

The level integration process shown at Step S21 in FIG. 7 is a process to calculate the level of the signal in the target channel at the reference point designated in the level display screen 110 if the dummy signal at the level accepted in the dummy input setting screen 100 is assumed to be inputted to the corresponding input port. If the target channel is the input channel 50, processes shown in FIG. 9 are executed as this process.

In these processes, first, the CPU of the PC 30 sets, as an initial value of the level Lx, the signal level at the input port to which the target channel is patched (S41). Then, if the reference point is IM2 or thereafter, this means that the signal is processed by the attenuator 51 before reaching the reference point, and therefore, the CPU calculates a gain of the attenuator 51 based on current data and adds a value of the gain to Lx (S42, S43). Further, if the reference point is IM4 or thereafter, this means the signal is further processed by the volume 55 before reaching the reference point, and therefore, the CPU calculates a gain of the volume 55 based on the current data and further adds a value of the gain to Lx (S44, S45). Thereafter, the flow returns to the original processes.

Figure 10:
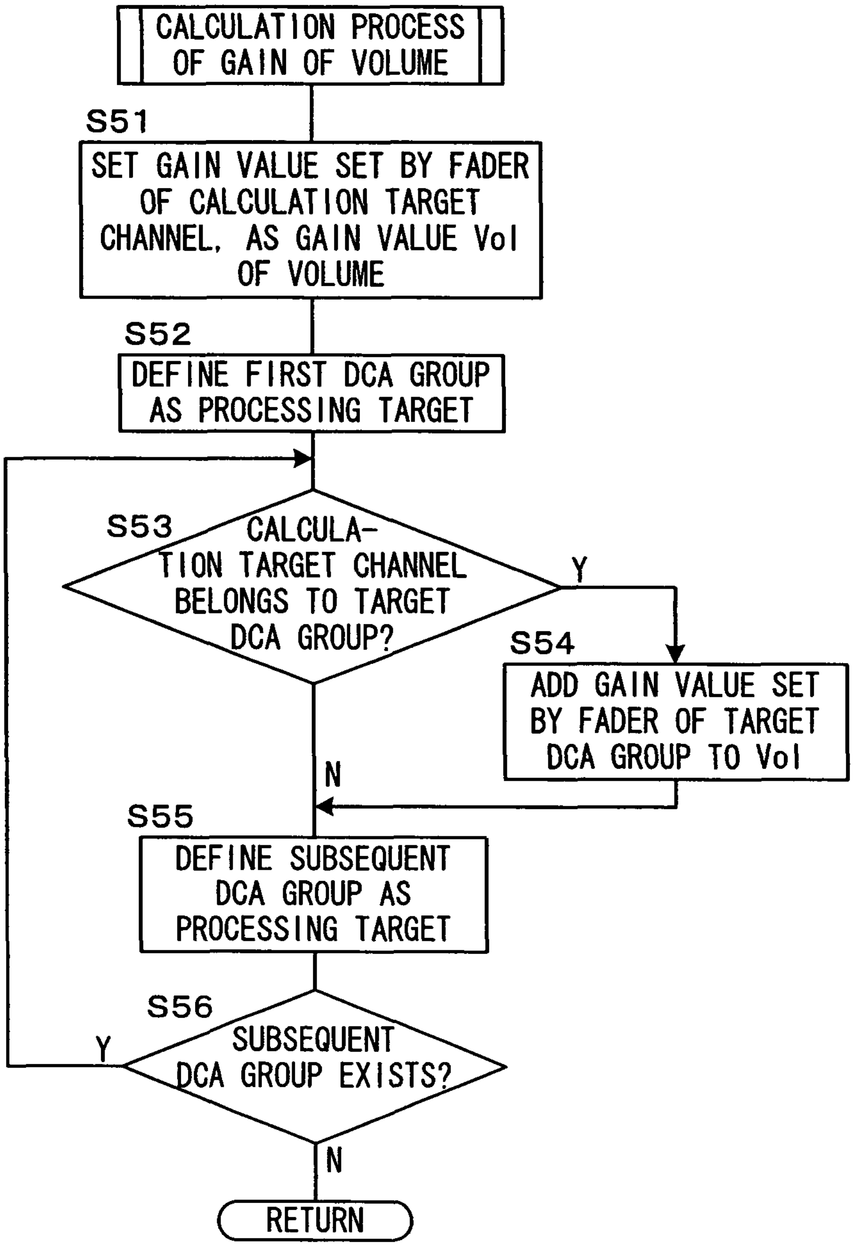

Here, FIG. 10 shows a flowchart of a calculation process of the gain value of the volume in a channel.

The gain value of the volume of each channel used at Step S45 in FIG. 9 is not necessarily a value defined based on a single parameter, and can be calculated by the processes shown in FIG. 10.

In these processes, as an initial value of a gain value Vol of the volume, the CPU of the PC 30 sets a gain value set by the fader of the target channel of the gain value calculation (S51). Then, the CPU sequentially defines the DCA groups prepared in the digital mixer 10 as a target, and if the target channel of the gain value calculation belongs to the target DCA group, adds a gain value set by a fader of this DCA group to the Vol (S52 to S56), and the flow returns to the original processes.

Therefore, if the target channel of the gain value calculation belongs to no DCA group, the gain value set by the fader of this channel is defined as the value of Vol as it is, and if the target channel of the gain value calculation belongs to any of the DCA groups, a value resulting from the addition of the gain value set by the fader of this DCA group is the value of the Vol.

The calculation processes for the input channel are shown here, but a gain value Vol in an output channel can be also calculated by similar processes.

Figure 11:
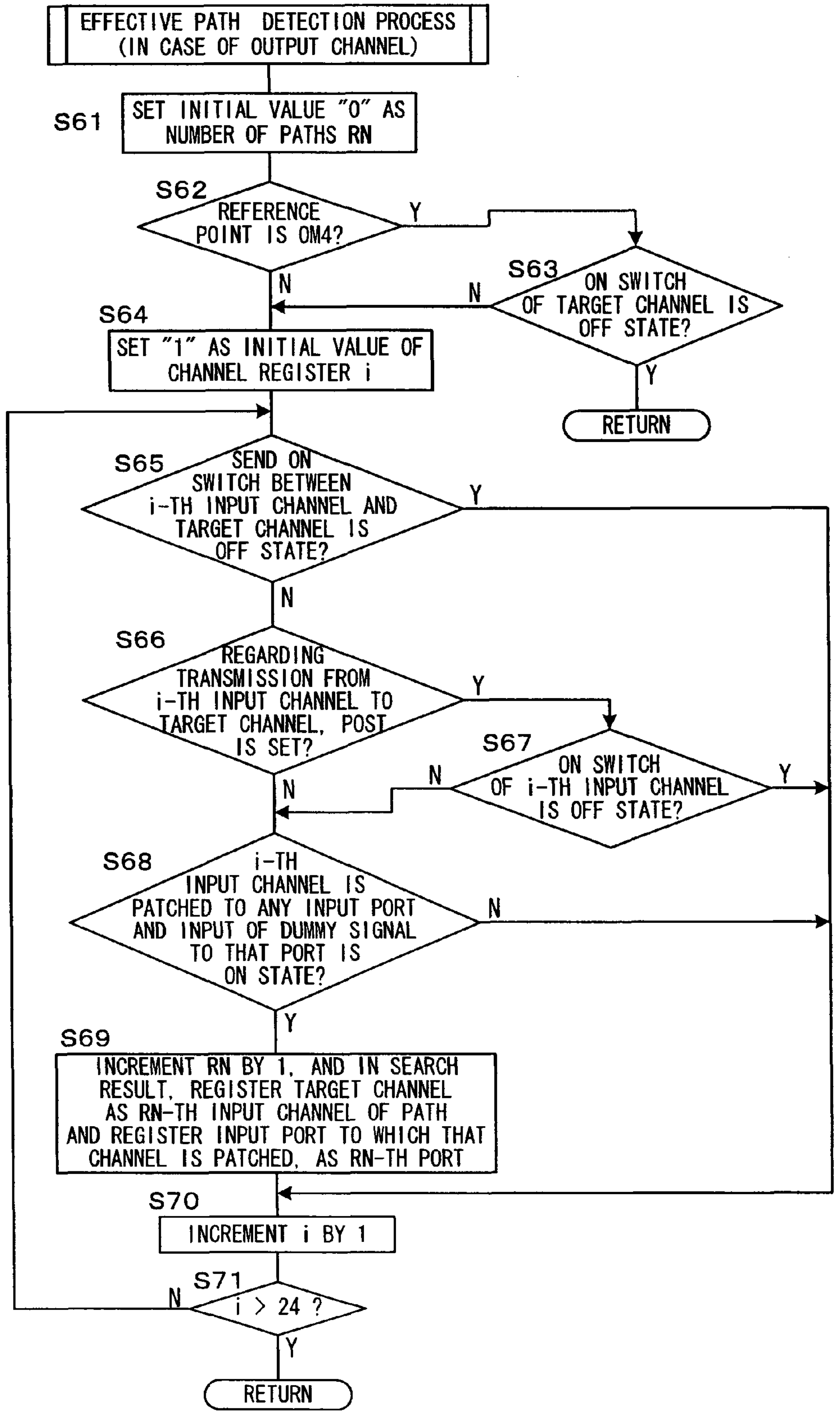
FIG. 11 is a flowchart of the effective path detection process shown in FIG. 7 in a case where the target channel is an output channel.

Next, FIG. 11 shows a flowchart of the effective path detection process in a case where the target channel is an output channel.

If the target cannel is the output channel 80, the processes shown in FIG. 11 are executed as the effective path detection process shown at Step S19 in FIG. 7.

In these processes, first, the CPU of the PC 30 sets an initial value "0" as the number of the paths RN (S61). Then, if the reference point is OM4 and the ON switch 84 of the target channel is OFF, this means that a processing element turning off the signal exists in the middle of the signal processing path and the signal does not reach the reference point OM4 in the target channel, and therefore, the flow returns directly to the original process (S62, S63). In this case, RN remains 0, which indicates that no effective path has been detected.

On the other hand, if NO at either Step S62 or Step S63, the CPU Sets "1" as an initial value of a channel register i (S64), and executes the following processes for path detection for the i-th input channel (S65 to S69).

Specifically, first, if the send ON switch 59 between the i-th input channel and the target channel is OFF (S65), this means that a processing element turning off the signal exists in the middle of the signal processing path and the signal does not reach the target channel from this input channel, and therefore, this input channel is not registered as an effective path, and the flow goes to Step S70.

Further, if, regarding the transmission from the i-th input channel to the target channel, the PRE/POST switch 57 is set to POST and the ON switch 56 of the i-th input channel is OFF (S66, S67) even though NO at Step S65, this means that the signal from this input channel similarly does not reach the target channel, and therefore, this input channel is not registered as an effective path and the flow goes to Step S70.

Further, even if NO at either Step S66 or S67, if conditions are not satisfied that the i-th input channel is patched to any of the input ports by the input patch 43 and dummy signal input to this port is ON (S68), the signal from this input channel does not similarly reach the target channel, and therefore, this input channel is not registered as an effective path and the flow goes to Step S70.

Then, if YES at Step S68, this means that the signal from the i-th input channel reaches the target channel, and therefore, the CPU resisters, as a path search result, this input channel and the input port to which the input channel is patched. Since one path is newly found, the CPU increments RN by 1 (S69) and the flow goes to Step S70.

Then, at Step S70, the CPU increments i by 1, and if i is not larger than 24 which is the number of the input channels, the flow returns to Step S65 and the processes are repeated. On the other hand, if i is larger than 24, the path detection is finished and the flow returns to the original process.

FIG. 12 shows an example of path data registered as the search result in the above processes.

As shown in FIG. 12, in the path data, data indicating the number of input channels from which signals reach the reference point of the target channel is first registered as the number of paths RN, and data on the input channels and input ports through which the signals reach the reference point are also registered as the numbers of the 1st to RN-th input channels and input ports.

By using these data, the level integration process to be described next is executed.

Figure 13:
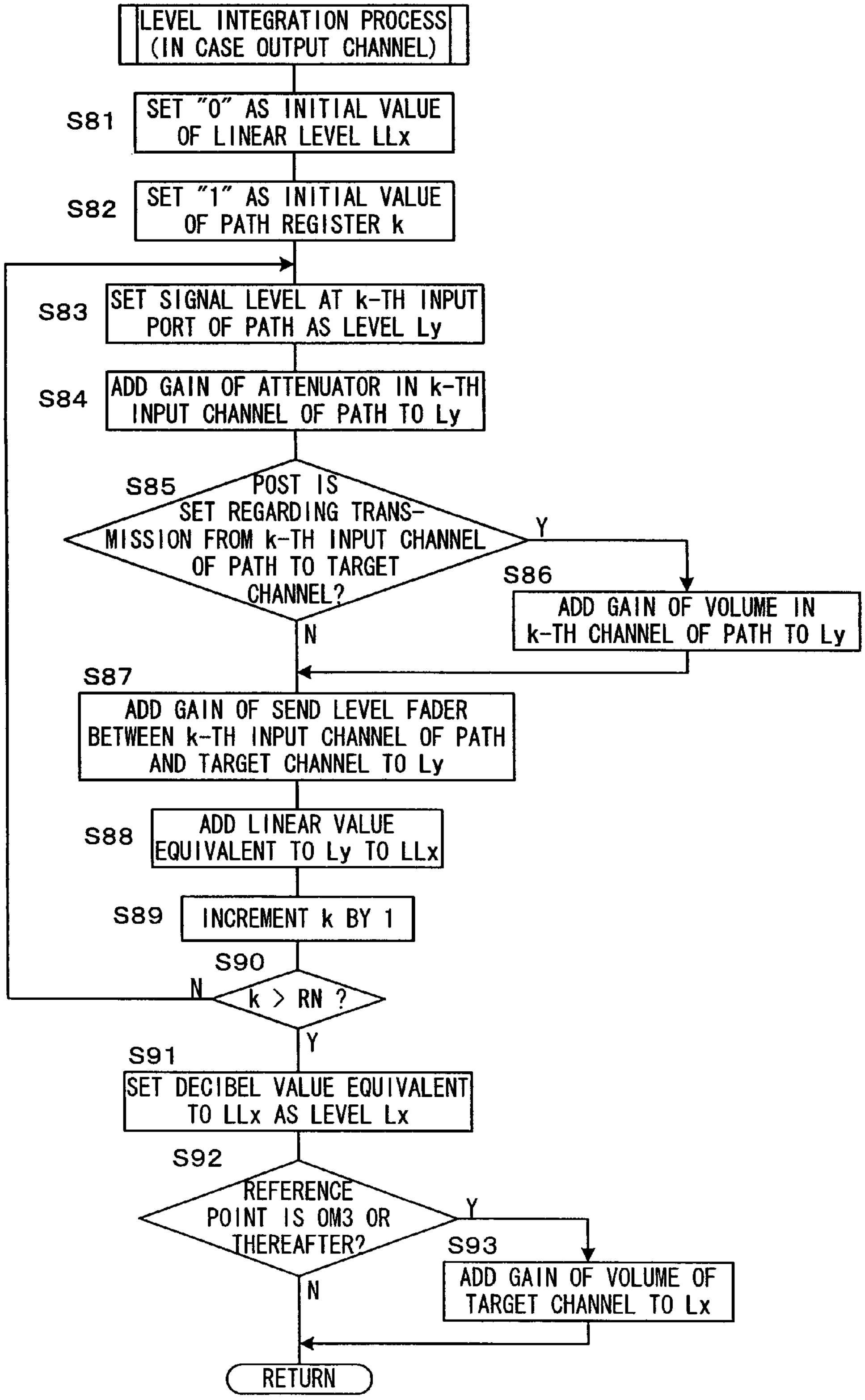
FIG. 13 is a flowchart of the level integration process shown in FIG. 7 in a case where the target channel is an output channel.

Next, FIG. 13 shows a flowchart of the level integration process in a case where the target channel is an output channel.

If the target channel is the output channel 80, the processes shown in FIG. 13 are executed as the level integration process shown at Step S21 in FIG. 7.

In these processes, since it is necessary to add the levels of the signals from the input channels registered in the path data, the CPU of the PC 30 first sets "0" as an initial value of a linear level LLx (S81), and sets "1" as an initial value of a path register k (S82). Thereafter, the CPU executes processes for signal level calculation for the k-th path (S83 to S90) described below.

Specifically, first, the CPU sets, as level Ly, signal level at the k-th input port of the path registered in the path data shown in FIG. 12 (S83). Then, the CPU calculates a gain of the attenuator 51 in the k-th input channel of the path based on current data, and adds a value of the gain to Ly (S84). Then, if the PRE/POST switch 57 is set to POST regarding the transmission from the k-th input channel of the path to the target channel, the CPU calculates a gain of the volume 55 in the k-th input channel based on the current data, and adds a value of the gain to Ly (S85, S86).

Further, the CPU calculates a gain of the send level fader 58 of a transmission path from the k-th input channel of the path to the target channel based on the current data, and adds a value of the gain to Ly (S87), whereby the level Ly of the signal sent from the k-th input channel of the path to the MIX bus 60 is calculated. Incidentally, an input channel in which the signal is shut off by the send ON switch 59 or the ON switch 56 should not have been registered as an effective path, and therefore, these processing elements are not taken into consideration here in the level calculation.

Then, the CPU adds, to LLx, a linear value equivalent to the value of Ly calculated up to Step S87 (S88), increments k by 1 (S89), and if k is not larger than RN, the flow returns to Step S83 and the processes are repeated (S90). If k is larger than RN, that is, if the addition of the signal level Ly to LLx has been completed for all the paths, the flow goes to processes at and after Step S91.

Then, the CPU sets a decibel value equivalent to LLx as level Lx (S91), and if the reference point is OM3 or thereafter, this means that the signal is processed by the volume 83 before reaching the reference point, and therefore, the CPU calculates a gain of the volume 83 based on current data, adds a value of the gain to Lx (S92, S93), and the flow returns to the original processes. Incidentally, in a case where the signal of the target channel is shut off by the ON switch 84 before reaching the reference point, no effective path should have been detected and the flow should not have reached the level addition process in the processes shown in FIG. 7. Therefore, in calculating the level, the ON switch 84 is not taken into consideration here.

The decibel value can be converted to the linear value according to the following equation (1), and the linear value can be converted to the decibel value according to the following equation (2). Here, since the linear value is returned to the decibel value again, there is no need to convert the unit to v (volt) when the decibel value is converted to the linear value. Further, in a case where the linear value is 0, the decibel value resulting from the conversion is preferably a value indicating the lowest level of the signal.

$$LLx = 10^{Ly/20} \quad (1)$$

$$Lx = 20 \times \log_{10} LLx \quad (2)$$

By executing the above processes described using FIG. 7 to FIG. 13, the PC 30 can display what levels signals would become at the reference point if signals at certain levels are inputted to the digital mixer 10 and are processed by the digital mixer 10 according to current data, even when the PC 30 is operated independently or the digital mixer 10 is in an offline state. When the digital mixer 10 is in the online state, these levels can be displayed, according to data received from the digital mixer 10, on the same screen as a screen which displays levels of signals currently processed in the DSP 18.

Therefore, when intending to remote-control the digital mixer 10 by the PC 30, a user of the PC 30 can easily confirm the levels that the signals would have if signal processing is executed according to the remote controlling, without using the digital mixer 10. Therefore, the user can easily confirm whether or not desired signal processing can be executed by the digital mixer 10 according to the contents of the current data being edited, or which part is not as desired.

In particular, as for the setting for processing elements such as the input patch, the ON switches, the faders, the send levels, the send ON switches, and the DCA groups, there are many demands for confirming the contents of the setting before the digital mixer 10 is brought into the online state, and the above-described processes can easily meet such a demand.

Further, in this case, since it is possible to calculate the levels without actually executing the signal processing, the display with a low processing load is enabled.

Further, in calculating the signal level necessary for the display, if a processing element turning off the signal exists in the middle of the signal processing path, the level calculation for this signal processing path is cancelled and a predetermined OFF level (lowest level) is displayed as the signal level, which can further reduce the processing load.

The foregoing has described this embodiment, but it goes without saying that the structure and concrete processing contents of the device, the display contents on the screen, and so on are not limited to those described in the above embodiment.

For example, in calculating the signal level, the signal level at the selected reference point may be calculated in a manner that, instead of searching for an effective path, the signal levels are sequentially calculated while calculating gains of the processing elements which are provided along the signal supply paths from all the input ports to the end of the output channel. In this case, if a processing element turning off the signal exists in the middle of any of the signal paths, the level calculation for this path is preferably also cancelled, and a predetermined OFF level is displayed as the signal level.

Further, the positions of the reference points are not limited to those in the above-described embodiment, and for example, the signal levels at the output ports ahead of the output patch 44 may be made displayable. This makes it possible to confirm the setting contents of the output patch 44 as well.

Further, in calculating the signal level, the compressors and the noise gates, which are not taken into consideration in the above-described embodiment, may be taken into consideration. However, in these processing elements, gains differ depending on the input signal level, and therefore, the signal level is preferably calculated by using a numerical expression or a table which is prepared to show the relation between the input signal level and the gain or the output signal level.

Further, in the above-described embodiment, the input of the dummy signal to a desired input port is set, but instead, the input of the dummy signal to a desired bus may be made settable. In this case, the level of the dummy signal in the input channel cannot be displayed, but the level display in stages at and after the output channel is enabled by simpler arithmetic operation. Similarly, the calculation and display of the signal level at the reference point may be made possible in a manner that the input of a dummy signal to another signal processing element currently engaged in the processing is set, and the levels resulting from only the signal processing in and after this signal processing element are added.

Further, in the above-described embodiment, the reference points are provided in the input channels and the output channels, but if they are provided on an output side of the output patch, the setting contents of the output patch can be also confirmed.

Moreover, the setting of the frequency of a dummy signal which is assumed to be inputted to each of the input ports of the digital mixer 10 may be accepted, and a gain in the equalizer may be used in the calculation of the signal level, taking a filter characteristic in the equalizer into consideration. Further, the setting of the frequency characteristic may be accepted, and the frequency characteristic of the signal at the reference point, which is calculated in consideration of the filter characteristic in the equalizer or the like, may be made displayable.

In a case where the configuration of the DSP 18 is different from that of the above-described embodiment, the signal level calculation processes differ accordingly, but it is a matter of course that the same functions as in the above-described embodiment can be realized.

It goes without saying that the invention is applicable not only to the controllers controlling the digital mixer but also to controllers controlling electronic devices such as a synthesizer, an electronic musical instrument, and a hard disk recorder having the audio signal processing function of the digital mixer. The invention is also applicable to a case where a plurality of signal processing devices are control targets of the controller and to a case where the structure of the signal processing executed by the signal processing device is also editable in the controller.

Further, the same effects can be obtained in such a manner that a program to cause a computer to control hardware and function as the above-described controller is stored in a ROM, a HDD, or the like in advance, or is recorded in a nonvolatile memory such as a CD-ROM or a flexible disk to be supplied and read from this memory to a RAM, and the CPU is caused to execute the program, or such a program is downloaded from an external device including a memory in which the program is recorded or from an external device including a memory such as a HDD in which the program is recorded and the CPU is caused to execute the downloaded program.

As is apparent from the above description, according to the controller of the invention, when the signal processing device is intended to be remote-controlled by the controller, it is possible to easily confirm the signal levels which would be obtained if signal processing is performed according to the remote controlling, without using the signal processing device.

Further, according to the recording medium of the invention, it is possible to cause a computer to function as the above-described controller and to realize the features thereof, and accordingly the same effects can be obtained.

Therefore, the application of the invention makes it possible to enhance the convenience when parameter values for controlling a signal processing device are edited in the controller.

What is claimed is:

1. A controller for emulating signal processing of audio signals along a signal path including a plurality of processing elements, the controller comprising:

a setting device that sets levels of one or more dummy signals to one or more corresponding processing elements in the signal path;

a designating device that designates a reference point in the signal path where a level of the audio signal subject to emulated signal processing is monitored display;

a path detector that detects one or more emulated signal paths from said one or more processing elements to said reference point;

a level calculator that calculates the level of the audio signal subject to emulated signal processing at said reference point based on one or more parameters stored in the controller, said level calculator calculates a plurality of levels of the audio signal at said reference point, raised by the dummy signals traveling through the detected signal paths from said one or more processing elements to said reference point, and integrates the plurality of calculated levels to obtain the level of the audio signal when said path detector detects more than one signal path; and a display device that displays the calculated level, wherein said emulated signal processing is performed without requiring the audio signal be actually processed by a signal processing device.

2. A controller according to claim 1, wherein said path detector is capable of detecting more than one signal path for said reference point.

3. A controller according to claim 1, wherein said level calculator calculates the level of no signal at said reference point when said path detector detects no signal path as for said reference point.

4. A controller according to claim 1, said setting device further sets a level of each of said one or more dummy signals.

5. A non-transitory machine-readable medium containing program instructions executable by a computer and causing said computer to function as said controller according to claim 1.

* * * * *